(12) United States Patent
Gill

(10) Patent No.: US 6,280,123 B1
(45) Date of Patent: Aug. 28, 2001

(54) SELF-ADHERING DRILL AND CUTTER

(75) Inventor: Jeffrey Steven Gill, Davison, MI (US)

(73) Assignee: Hougen Manufacturing Co., Swartz Creek, MI (US)

( * ) Notice: Subject to any disclaimer, the term of this patent is extended or adjusted under 35 U.S.C. 154(b) by 0 days.

(21) Appl. No.: 09/525,139

(22) Filed: Mar. 14, 2000

Related U.S. Application Data

(60) Provisional application No. 60/124,491, filed on Mar. 15, 1999.

(51) Int. Cl.[7] .............................. B23B 45/00; B23B 51/04
(52) U.S. Cl. ........................... 408/76; 408/124; 408/135; 408/141; 408/204; 408/206
(58) Field of Search .............................. 408/76, 124, 135, 408/136, 141, 204, 206, 207, 703; 409/231

(56) References Cited

U.S. PATENT DOCUMENTS

| | | |
|---|---|---|
| Re. 28,416 | 5/1975 | Hougen . |
| Re. 33,440 | 11/1990 | Hougen ................................ 408/206 |
| 640,108 | 12/1899 | Dalzell . |
| 983,083 * | 1/1911 | Pealing ................................... 408/76 |
| 1,032,408 * | 7/1912 | Himoff .................................. 408/135 |
| 1,397,696 * | 11/1921 | Nelson ................................. 408/135 |
| 2,356,641 * | 8/1944 | Wolfle .................................. 408/135 |
| 2,786,498 * | 3/1957 | Schankler .............................. 408/124 |
| 3,456,532 | 7/1969 | Hougen . |
| 3,559,513 | 2/1971 | Hougen . |
| 3,609,056 * | 9/1971 | Hougen ................................ 408/204 |
| 3,648,508 | 3/1972 | Hougen ................................. 72/325 |
| 3,765,789 | 10/1973 | Hougen ................................ 408/204 |
| 3,825,362 | 7/1974 | Hougen .................................. 408/68 |
| 3,860,354 | 1/1975 | Hougen ................................ 408/206 |
| 4,131,384 | 12/1978 | Hougen .................................. 408/68 |
| 4,193,721 | 3/1980 | Hougen .................................. 408/68 |
| 4,261,673 | 4/1981 | Hougen ................................... 408/5 |
| 4,322,187 | 3/1982 | Hougen ................................ 408/204 |
| 4,322,188 | 3/1982 | Hougen ................................ 408/206 |
| 4,408,935 * | 10/1983 | Miyanaga ............................ 408/206 |
| 4,452,554 * | 6/1984 | Hougen ................................ 408/206 |
| 4,516,890 | 5/1985 | Beharry ................................ 408/204 |
| 4,538,944 | 9/1985 | Hougen ................................ 408/206 |
| 4,557,641 | 12/1985 | Hougen ................................ 408/204 |
| 4,632,610 | 12/1986 | Hougen ................................ 408/204 |
| 4,871,287 | 10/1989 | Hougen ................................ 408/204 |
| 5,094,573 | 3/1992 | Hougen ................................ 409/132 |
| 5,145,296 | 9/1992 | Hougen ................................... 408/1 |
| 5,203,650 | 4/1993 | McCourtney .......................... 408/1 |

* cited by examiner

*Primary Examiner*—Daniel W. Howell
(74) *Attorney, Agent, or Firm*—Howard & Howard

(57) ABSTRACT

The present invention is a low profile self-adhering drill having a feed mechanism having an axis of rotation, which is generally perpendicular to the axis of rotation of the drill motor. The feed mechanism includes a quill housing which houses a quill. A spindle is disposed within the quill for holding the tool. The spindle is in engagement with the quill and rotates about the travel axis of the quill relative to the quill and is moveable along the axis with the quill. A rack on the quill is parallel to the travel axis and engages a feed gear such than when the feed gear is rotated the rack and quill move along the travel axis.

13 Claims, 5 Drawing Sheets

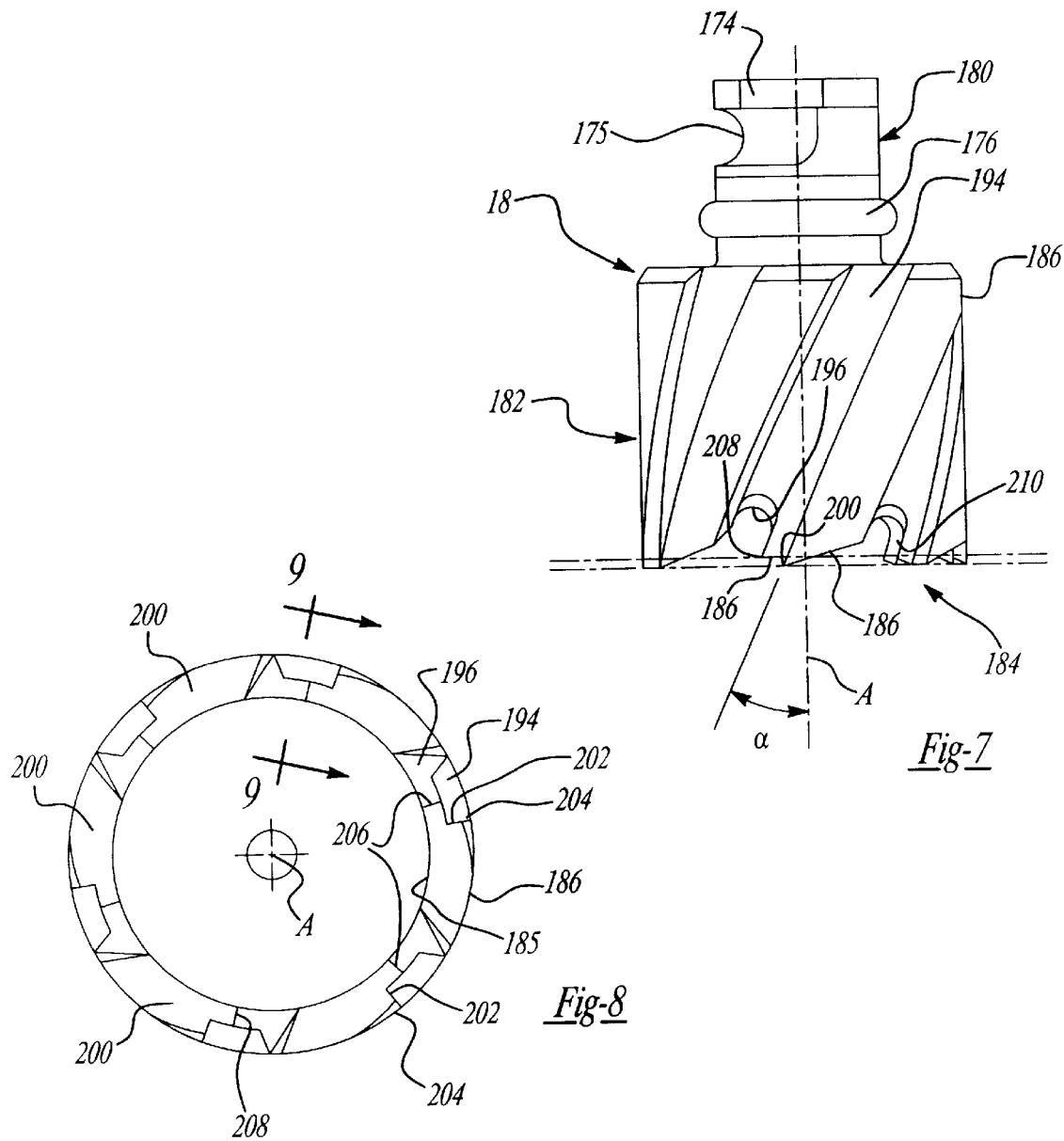
Fig-7
Fig-8
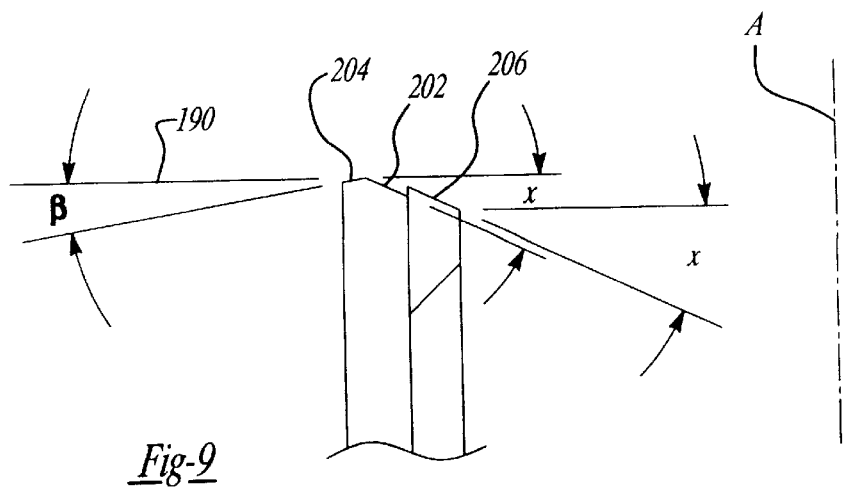
Fig-9

SELF-ADHERING DRILL AND CUTTER

BACKGROUND OF THE INVENTION

This application claims priority to provisional application no. 60/124,491 filed Mar. 15, 1999.

FIELD OF THE INVENTION

This invention relates to magnetic base drills that magnetically adhere to metallic work pieces. More specifically, this invention relates to a smaller or miniature magnetic base drill for use in confined spaces or for smaller tasks.

DESCRIPTION OF THE PRIOR ART

Magnetic base drills are used for large metallic work pieces that cannot be easily brought to a drill press and where a conventional hand drill would be insufficient. However, prior art magnetic drills, while portable, are still very large and cumbersome. Therefore, what is needed is a more portable, lightweight magnetic base drill.

BRIEF DESCRIPTION OF THE DRAWINGS

Other advantages of the present invention will be readily appreciated by reference to the following detailed description when considered in connection with the accompanying drawings wherein:

FIG. 7 is a side view of a cutting tool of the present invention;

FIG. 8 is an end view of the cutting tool shown in FIG. 7; and

FIG. 9 is a cross-sectional view taken along line 9—9 of FIG. 8.

DETAILED DESCRIPTION OF THE PREFERRED EMBODIMENT

Figure 1:
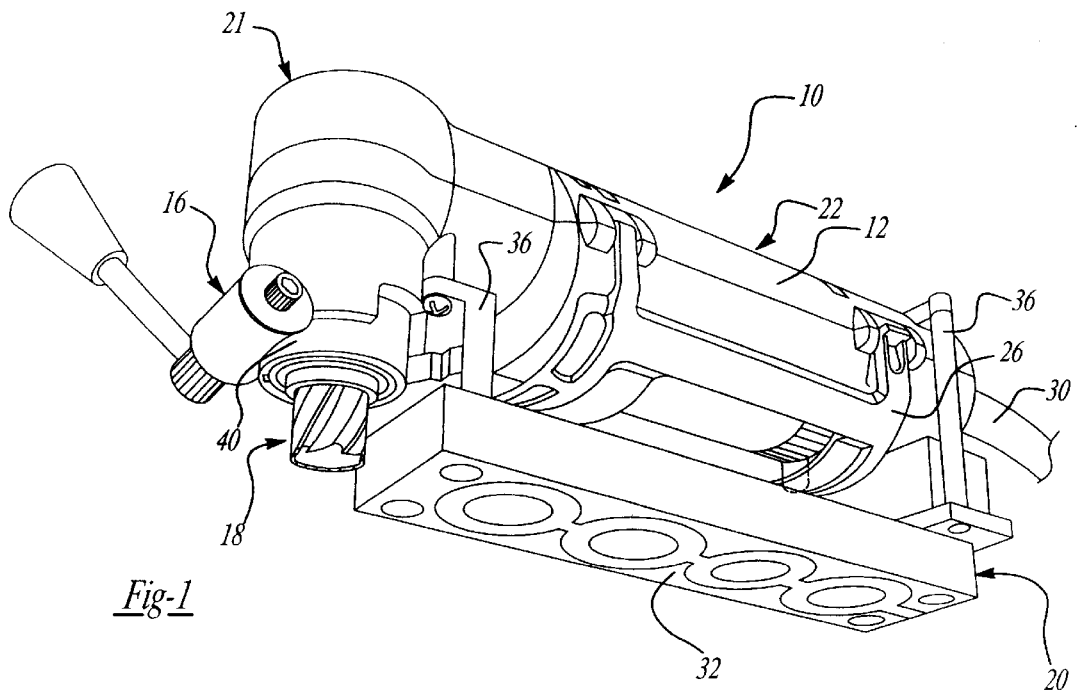
FIG. 1 is a perspective view of the present invention.
Figure 2:
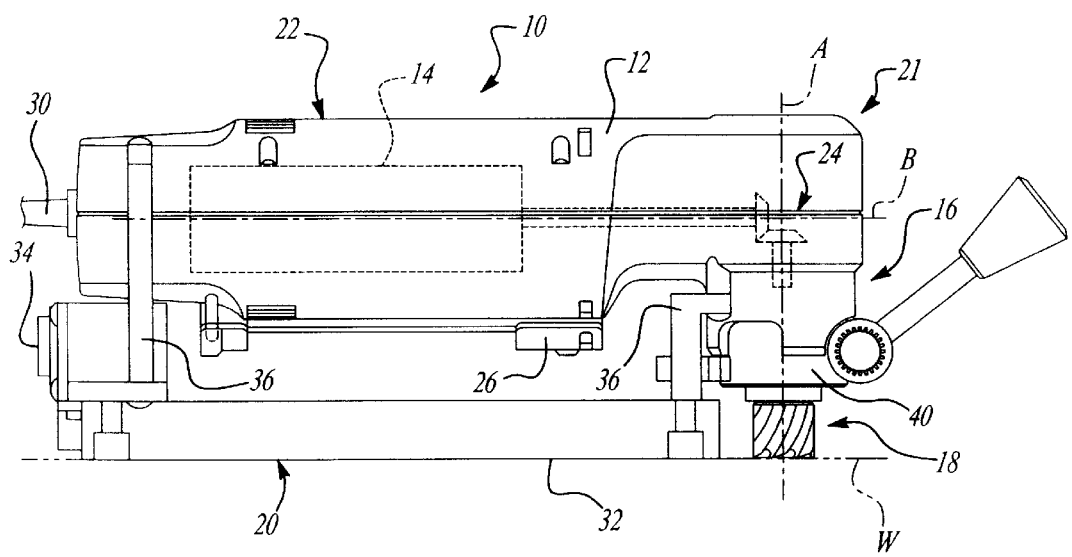
FIG. 2 is a side view of the present invention.

Referring to FIGS. 1 and 2, a low profile self-adhering magnetic base drill is shown generally at 10. The drill 10 has housing 12, or casing, which houses a motor 14 that drivingly engages a feed mechanism 16 with a cutting tool 18. The feed mechanism 16 advances the cutting tool 18 toward a work piece W. A magnetic base 20 is attached to the housing 12 and is used to anchor drill 10 to metallic work piece W. Although a magnetic base 20 is illustrated, other self-adhering bases could be used, for example, a vacuum base.

Figure 4:
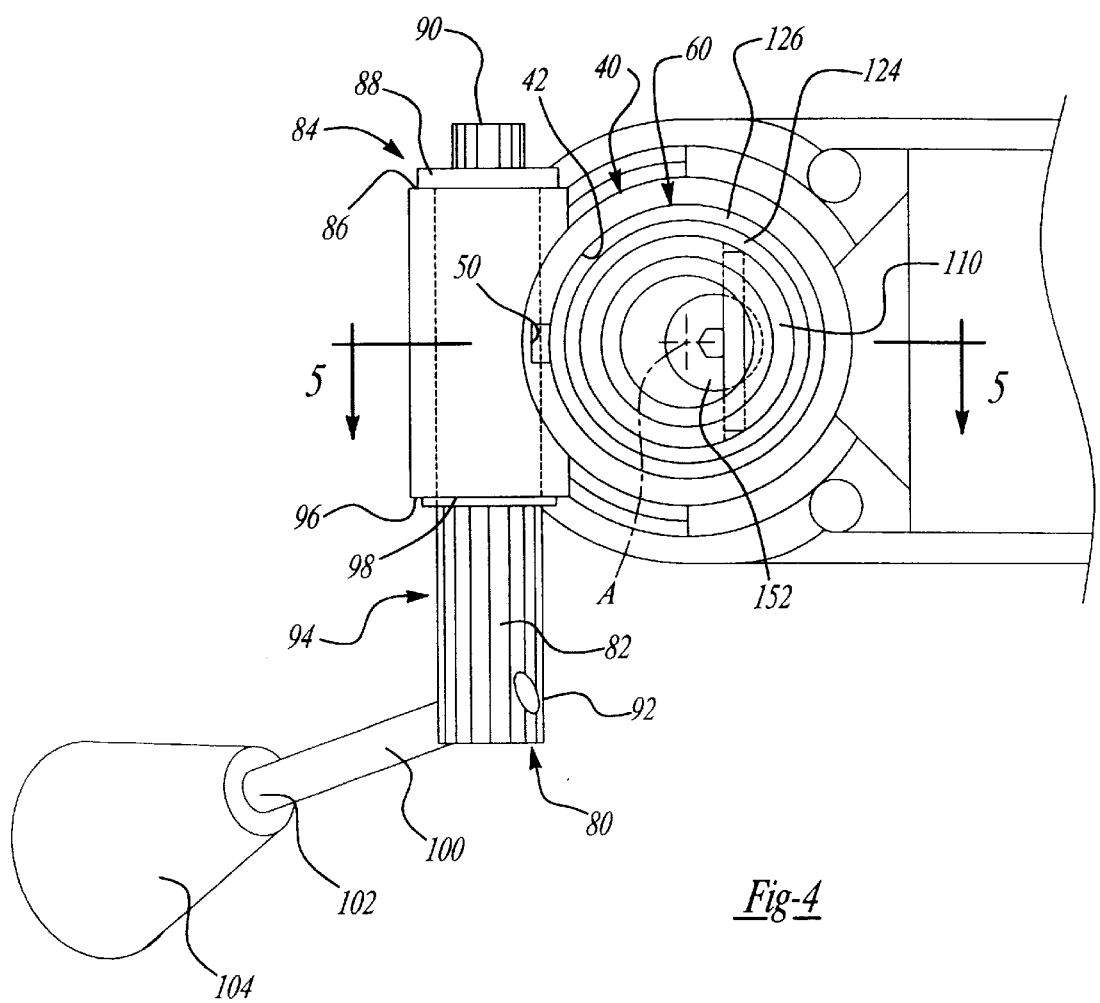
FIG. 4 is a bottom view of the feed mechanism of the present invention.

Feed mechanism 16 is mounted within one end 21 of the housing 12 and has a first axis of rotation A, see FIGS. 2 and 4. Motor 14 is mounted in an end 22 opposite feed mechanism 16, or the main elongated portion of drill 10, and has a second axis of rotation B at an angle to first axis A. The first A and second B axes are at a generally right angle which permits drill 10 to achieve a low profile. Motor 14 is coupled to feed mechanism 16 by gears 24 or in any other suitable manner.

In the best mode of the present invention, a modified DeWalt Model DW 160 3/8" right angle drill is used which operates on 110 volts and 3.6 amps and turns the cutting tool at 1200 RPM. The main portion 22 of drill 10 is used by the drill operator as a handle. A drill switch 26 is positioned on the underside of drill 10 for actuating motor 14 when an electrical cord 30 is plugged into an electrical source. While an electric motor is disclosed, it is to be understood that a drill with a pneumatic motor or any other drive mechanism may also be used.

Magnetic base 20 is a rectangular structure having a flat surface 32 for contacting work piece W. Base 20 contains electrically activated magnetic coils (not shown) that become attracted to metals having magnetic properties when current flows through the coils. In this application when "metallic work piece" is used it is intended to mean any work piece capable of being attracted by a magnet. A switch 34 connects the electrical cord 30 to the magnetic coils so that when electrical cord 30 is connected to an electrical source and switch 34 is placed in an "on" position, magnetic base 20 will become securely anchored to metallic work piece W. In the preferred embodiment, the switch 26 for actuating drill 10 is connected to magnetic base switch 34 in such a way so as to prevent electric motor 14 from being actuated unless the magnetic base 20 is switched on. This ensures that drill 10 cannot be operated without first being anchored properly to work piece W.

Magnetic base 20 is attached to housing 12 by a plurality of brackets 36 so that base 20 is generally parallel with main portion 22 of drill 10. If a commercially available drill is being used such as the DeWalt drill mentioned above, existing attachment holes in the housing may be used to attach the magnetic base 20 to the drill via brackets 36.

Figure 3:
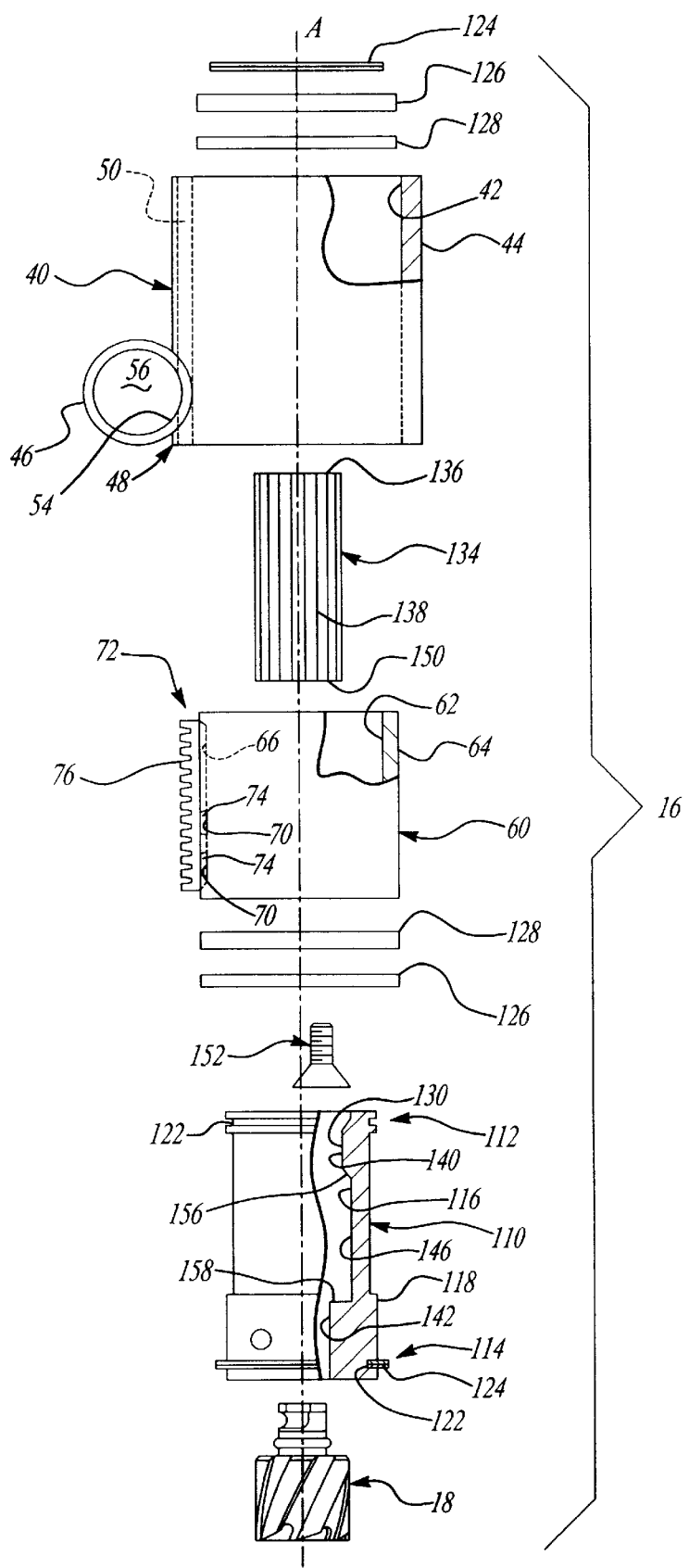
FIG. 3 is an exploded view of a feed mechanism of the present invention.

Feed mechanism 16, see FIG. 3, includes a quill housing 40 that is partially received in end 21 of housing 12 and is the structural component that houses the components used to couple cutting tool 18 to motor 14. These components, discussed below, also permit cutting tool 18 to be advanced and retracted along first axis A. Moreover, it should be appreciated from the following discussion that the feed mechanism of the present invention eliminates several components traditionally used in such feed mechanisms thereby resulting in a more compact design. It is this compact design that, in part, makes it possible to achieve the small, low profile design of the present invention.

Referring now to FIGS. 3 and 4, tubular quill housing 40 has a circular cross-section and includes inner 42 and outer 44 surfaces. The axis of quill housing 40 is concentric with first axis A. A tubular feed gear housing 46 is affixed transversely to a lower portion 48 of outer surface 44 and also has a circular cross-section. Inner surface 42 of quill housing 40 has a linear groove 50, best seen in FIG. 4, with a rectangular cross-section that is parallel with the first axis and which runs the entire length of quill housing 40. A rectangular aperture 54 passes from inner surface 42 of quill housing 40 through to an interior 56 of feed gear housing 46 where linear groove 50 intersects interior 56.

A tubular quill 60 having a circular cross-section is disposed with quill housing 40. The axis of quill 60 is also concentric with first axis A. Quill 60 has an inner surface 62 and an outer surface 64 that is in sliding engagement with inner surface 42 of quill housing 40. Outer surface 64 has an elongated recess 66 on outer surface 64 that runs parallel to first axis A. A pair of grooves 70 run transversely to elongated recess 66 on outer surface 64. A rack 72, which has a pair of tabs 74 that compliment grooves 70, is received in elongated recess 66 and grooves 70. Epoxy is used to secure rack 72 within elongated recess 66 and grooves 70, although it is possible to use other attaching means. Tabs 74 and grooves 70 help to ensure that rack 72 will not become detached form quill 60 when quill 60 is translated along first axis A.

Rack 72 has a plurality of teeth 76 projecting away from outer surface 64 of quill 60. These teeth 76 are received within linear groove 50 of quill housing 40 and extend through the rectangular aperture 54 and into feed gear housing 46. A feed gear 80 having a plurality of radially outwardly extending teeth 82 is disposed within feed gear housing 46. Feed gear teeth 82 engage teeth 76 on rack 72 so that when feed gear 80 is rotated about its axis, rack 72 and quill 60 are translated up and down along first axis A.

Feed gear 80 has a first end 84 that is adjacent With one end 86 of feed gear housing 46. A retaining washer 88 is fastened to first end 84 to aid in laterally locating feed gear 80 within feed gear housing 46. Feed gear 80 has a second end 92 and an intermediate portion 94 interposed between first 84 and second 92 ends. Intermediate portion 94 includes an annular groove (not shown) that is adjacent to another end 96 of feed gear housing 46 which receives a snap ring 98. Snap ring 98 in conjunction with retaining washer 88 laterally locate feed gear 80 so that feed gear 80 does not move laterally along its axis. A handle 100 is attached to feed gear 80 between intermediate portion 94 and second end 92 at an angle to the feed gear's axis. A distal end 102 of handle 100 has a knob 104 which when rotated about the feed gear's axis translates quill 60 along first axis A.

Returning to FIG. 3, a spindle 110 is disposed within quill 60 and has an axis coaxial with first axis A. Spindle 110 has top 112 and bottom 114 portions and inner 116 and outer 118 surfaces. Outer surface 118 is engagement with inner surface 62 of the quill 60. The feed mechanism 16 differs from prior art mechanisms in that the quill 60 is bronze and acts as the bearing between the steel quill housing 40 and the steel spindle 110. Typically, the quill is also constructed of steel which requires that bronze bushings be used between the quill housing and quill and the spindle and quill. By constructing the quill of bronze in accordance with the present invention, two bronze bearings may be eliminated thereby permitting a more compact feed mechanism.

Spindle 110 has an annular groove 122 on outer surface 118 of top 112 and bottom 114 portions for receiving retaining rings 124 to secure spindle 110 to quill 60. A metal 126 and plastic 128 thrust washer is interposed between retaining ring 124 and quill 60 at both top 112 and bottom 114 portions. In this manner, quill 60 and spindle 110 are coupled together and may be translated together along first axis A.

Inner surface 116 of top portion 112 of spindle 110 has a plurality of splines 130 extending radially inwardly from and parallel with first axis A. A shaft 134 having an axis coaxial with first axis A has a first end 136 coupled to drive motor 14 of drill 10. For the DeWalt drill disclosed, first end 136 is threaded onto a threaded shaft that is coupled to the motor 14. An exterior of shaft 134 has splines 138 extending radially outwardly from and parallel with first axis A. Shaft splines 138 slidingly mate with interior splines 130 of spindle 110. In this manner, shaft 134 rotatingly drives spindle 110 when motor 14 is actuated while permitting spindle 110 to be translated up and down along first axis A.

Inner cylindrical surface 116 has a diameter 140,142 at top 112 and bottom 114 portions and a larger diameter 146 along a length of inner surface 116. A second end 150 of shaft 134 includes a stop 152 for limiting the travel of spindle 110 along first axis A. Stop 152 is positioned in close proximity to larger diameter 146 so that when stop 152 reaches the top 112 or bottom 114 portion diameters 140, 142, stop 152 will abut a lip 156,158 on inner surface 116. In the best mode of the present invention, a fastener is used for the stop and is offset from first axis A.

Figure 5:
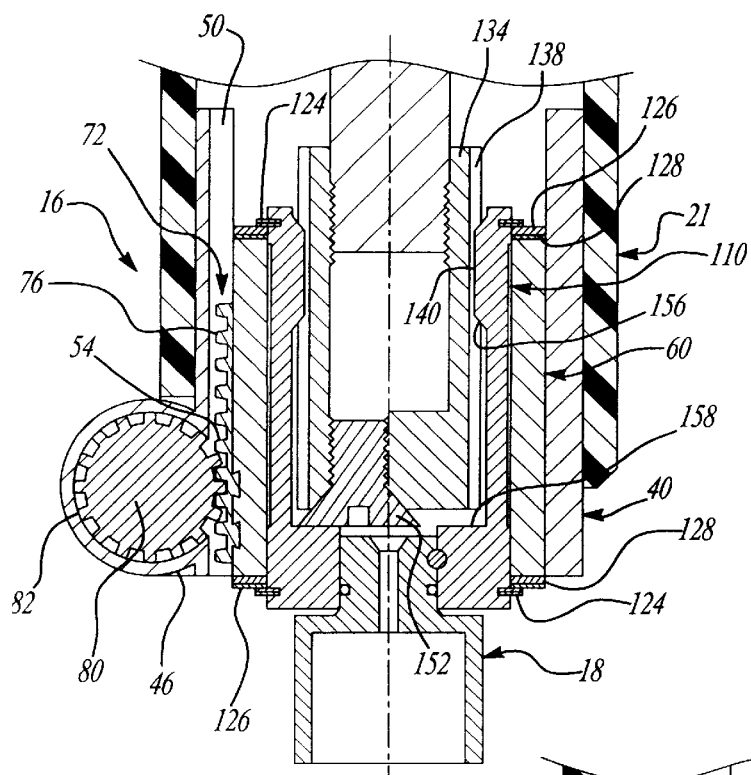
FIG. 5 is a cross-sectional view taken along line 5—5 of FIG. 4 with the feed mechanism in the fully retracted position.
Figure 6:
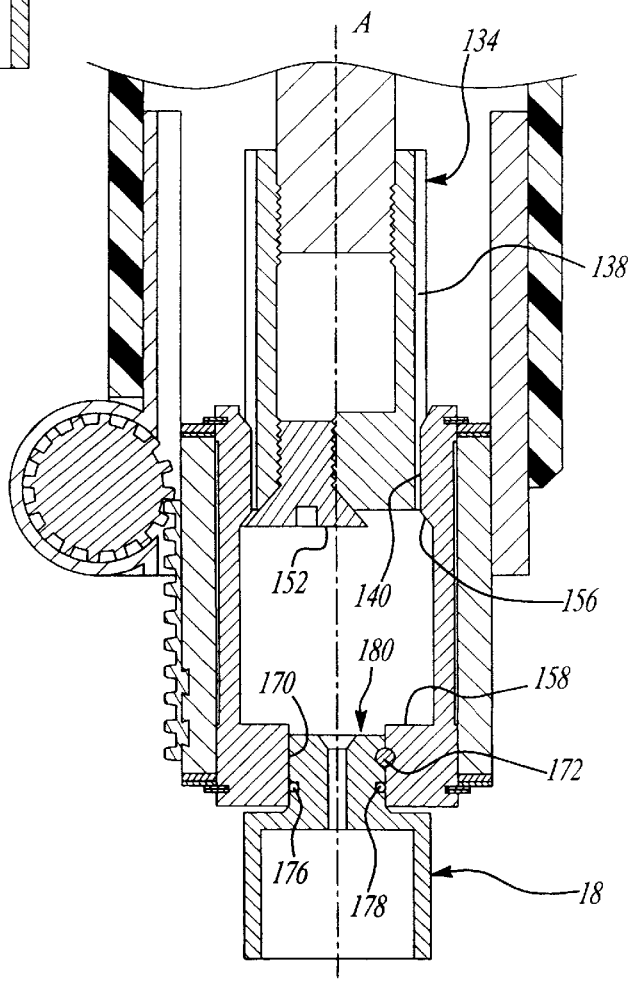
FIG. 6 is a view similar to that of FIG. 5, but with the feed mechanism in the fully extended position.

Feed mechanism 16 is shown in its retracted and extended positions in FIGS. 5 and 6, respectively. To advance cutting tool 18 to the extended position from the retracted position, handle 100 is rotated about the feed gear's axis. Feed gear 80 rotates about its axis thereby translating rack 72 downward and parallel to first axis A. Rack 72 translates quill 60 and spindle 110 which is secured to quill 60 by retaining rings 124. Spindle 110 slides downward along splines 130, 138 as shaft 134 rotatingly drives spindle 110 and cutting tool 18. Spindle 110 and cutting tool 18 are fully extended when stop 152 engages lip 156 on inner surface 116 of top portion 112 of spindle 110.

To retract cutting tool 18 from the extended position, handle 100 is rotated about the feed gear's axis in an opposite direction thereby translating the feed mechanism's components along first axis A in the opposite direction. Spindle 110 and cutting tool 18 are fully retracted when stop 152 engages lip 158 on inner surface 116 of bottom portion 114.

Typical cutting tool geometries have been discovered to be unsuitable when combined with the drill and feed mechanism of the present invention. Therefore, the cutting tool of the present invention is specially adapted to be used with the compact drill design of the present invention. Specifically, the various cutting angles of previously known tools have been changed and a taper has been added to the cutting portion of the tool as explained in more detail below.

With reference to FIGS. 6 and 7, bottom portion 114 of spindle 110 has a hole 170 along first axis A with a pin 172 offset from and transverse to first axis A. Hole 170 is adapted to receive a shank portion 180 of cutting tool 18. Shank portion 180 has a flat 174 that leads into an annular recess 175 in a radial portion of the perimeter of shank portion 180. Cutting tool 18 is inserted into hole 170 by aligning flat 174 with pin 172 so that cutting tool 18 may be inserted into hole 170. To lock cutting tool 18 into hole 170, cutting tool 18 is rotated so that pin 172 is received within annular recess 175. A rubber seal 176 or O-ring is received within an annular groove 178 on the shank portion 180 to prevent debris from entering hole 170 which would make removal of cutting tool 18 from hole 170 more difficult.

Referring to FIGS. 7–9, cutting tool 18 has shank portion 180 and a cutting portion 182 extending from shank portion 180 along first axis A. Cutting portion 182 includes a cutting surface 184 and inner 185 and outer 186 surfaces that taper back towards shank portion 180. Inner surface 185 of cutting portion 182 tapers in the range of 0.010–0.025" over its length with a 0.016–0.020" range being preferred. Outer surface 186 of cutting portion 182 taper in the range of 0.015–0.035" over its length with a 0.020–0.024" range being preferred. The inner and outer taper is necessary to prevent binding as the hole is being machined by cutting tool 18 in the work piece.

Cutting surface 184 has a plurality of cutting teeth 200. In the disclosed embodiment, each of the cutting teeth 200 have cutting edges 202, 204 and 206. It should be appreciated by one of ordinary skill in the art that more or less cutting edges could be used.

The cutting edges are angled with respect to the horizontal plane. In the disclosed embodiment, outside cutting edge 204 has an angle B', the outside inclination angle, in the range of 5–15° with the preferred angle being 10°. A typical outside inclination angle of an ordinary cutter is approximately 35°. Cutting edge 202 has an angle X, i.e., an inside inclination angle, in the range of 20–30° with the preferred angle being 25°. In a typical cutter, the angle is approximately 15°. The inner most cutting edge 206 has the same inside inclination angle as the cutting edge 202.

Due to these cutting edge geometries, the cutter quickly stabilizes itself in the workpiece. The outer cutting edges 204 initially cut the workpiece surface so that the cutting tool immediately seats itself in the intended area of the workpiece. After the outer cutting edges begin the cut, the inner cutting edges 202 and 206 begin to cut and together form a kerf. The teeth 202, 204 and 206 continue to cut within the kerf until the hole is formed, leaving a slug in the cutting tool. As the cutting tool is retracted, the screw 152 engages a slug ejector, not shown, to eject the slug.

Outer surface 186 has a plurality of helical flutes 194 for channeling chips away from the work piece. The angle α of the helix is in the range of 22–30° with the preferred angle being 25° compared with a typical angle of normal cutters being 15°. Helical flutes 194 include gullets 196 for facilitating the discharge of chips.

The angles of the cutting tool the present invention ensure that the tool "bites" into the work piece and does not skid or twist off as a prior art tool would when used with the drill of the present invention. Moreover, the angles also accommodate the reduced power, speed, and torque of the smaller drill and magnetic base of the present invention as compared to the larger prior art designs.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An annular cutting tool for use with a low profile self-adhering drill comprising:

a shank portion for attachment to the drill;

a cutting portion extending from said shank along an axis and tapering from a cutting surface opposite said shank back towards said shank, said cutting surface forming first cutting plane and a second cutting plane above said first cutting plane, said planes being perpendicular to said axis;

a plurality of helical flutes in an outer surface of said cutting portion for channeling chips away from a work piece, said helical flutes having gullets there through which intersect said second cutting plane;

a first cutting edge on said first cutting plane for making an initial cut in the work piece, said first cutting edge having an inclination angle above said first cutting plane towards said axis; and a second cutting edge on said second cutting plane for cutting the work piece after said initial cut has been made, said second circular cutting edge having an inclination greater than the inclination angle of said first cutting edge.

2. The annular cutting tool of claim 1, wherein said first cutting edge has an inclination angle of between 5 to 15°.

3. The annular cutting tool of claim 1, wherein said first cutting edge has an inclination angle of about 10°.

4. The annular cutting tool of claim 1, wherein said second cutting edge has an inclination angle of between 20 to 30°.

5. The annular cutting tool of claim 1, wherein said second cutting edge has an inclination angle of about 15°.

6. The annular cutting tool of claim 1, wherein said helical flute has a helix angle in the range of 20 to 30°.

7. A low profile self-adhering drill comprising:

a housing;

a feed mechanism having a first axis of rotation and being mounted in said housing;

a motor having a second axis of rotation at an angle to said first axis of rotation and being mounted in said housing, said motor being coupled to said feed mechanism for rotating a driving said feed mechanism; and a self-adhering base attached to said housing for securely attaching the drill to a work piece;

said feed mechanism including a quill housing for mounting to the drill, said quill housing having an axis;

a quill disposed within said quill housing and being in engagement therewith, said quill being moveable along said axis relative to said housing;

a spindle disposed within said quill for holding a tool, said spindle being in engagement with said quill and rotatable about said axis relative to said quill and moveable along said axis with said quill;

a feed gear supported on said quill housing; and a rack on said quill parallel to said axis for engagement with said feed gear such that when said feed is rotated said rack and quill move along said axis.

8. The low profile self-adhering drill as set forth in claim 7, further comprising a shaft for rotatably driving said spindle about said axis, said shaft having splines extending radially outwardly from and parallel with said axis, and wherein said spindle further includes splines extending radially inwardly from and parallel with said axis for slidingly mating with said exterior splines of said shaft.

9. The low profile self-adhering drill as set forth in claim 8, wherein said spindle further includes an inner cylindrical surface having a diameter at top and bottom portions and a larger diameter than said diameter disposed between said first and second ends along a length of said inner cylindrical surface, and wherein said shaft further includes a stop fixed to a portion of said shaft for limiting the travel of said spindle to along said axis to said length.

10. The low profile self-adhering drill as set forth in claim 9, wherein said stop includes a threaded body and a head portion, said shaft having an internally threaded bore, said threaded bore receiving said threaded body with said head portion being positioned within said larger diameter.

11. The low profile self-adhering drill of claim 7, wherein said quill is constructed of bronze, whereby said feed mechanism is more compact.

12. The low profile self-adhering drill of claim 7, wherein said spindle has a quick disconnect for quickly attaching and removing a cutter.

13. The annular cutting tool of claim 1, herein said helical flute has a helix angle of about 25°.

* * * * *